Oct. 15, 1968    C. F. KANTOLA    3,405,449
RAIL TRACK GAUGE
Filed Jan. 17, 1967    4 Sheets-Sheet 2

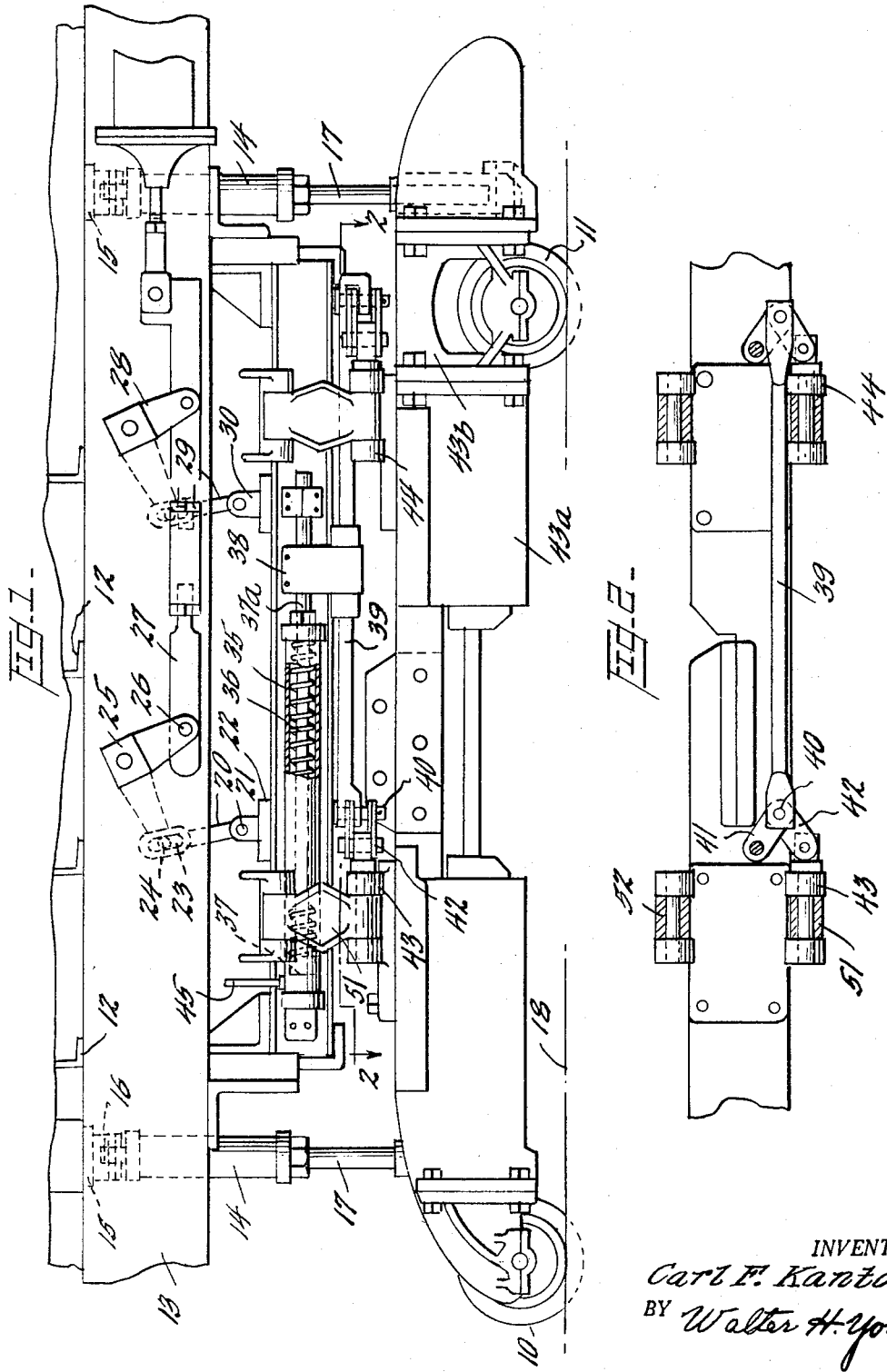

INVENTOR.
Carl F. Kantola,
BY Walter H. Young
ATTORNEY

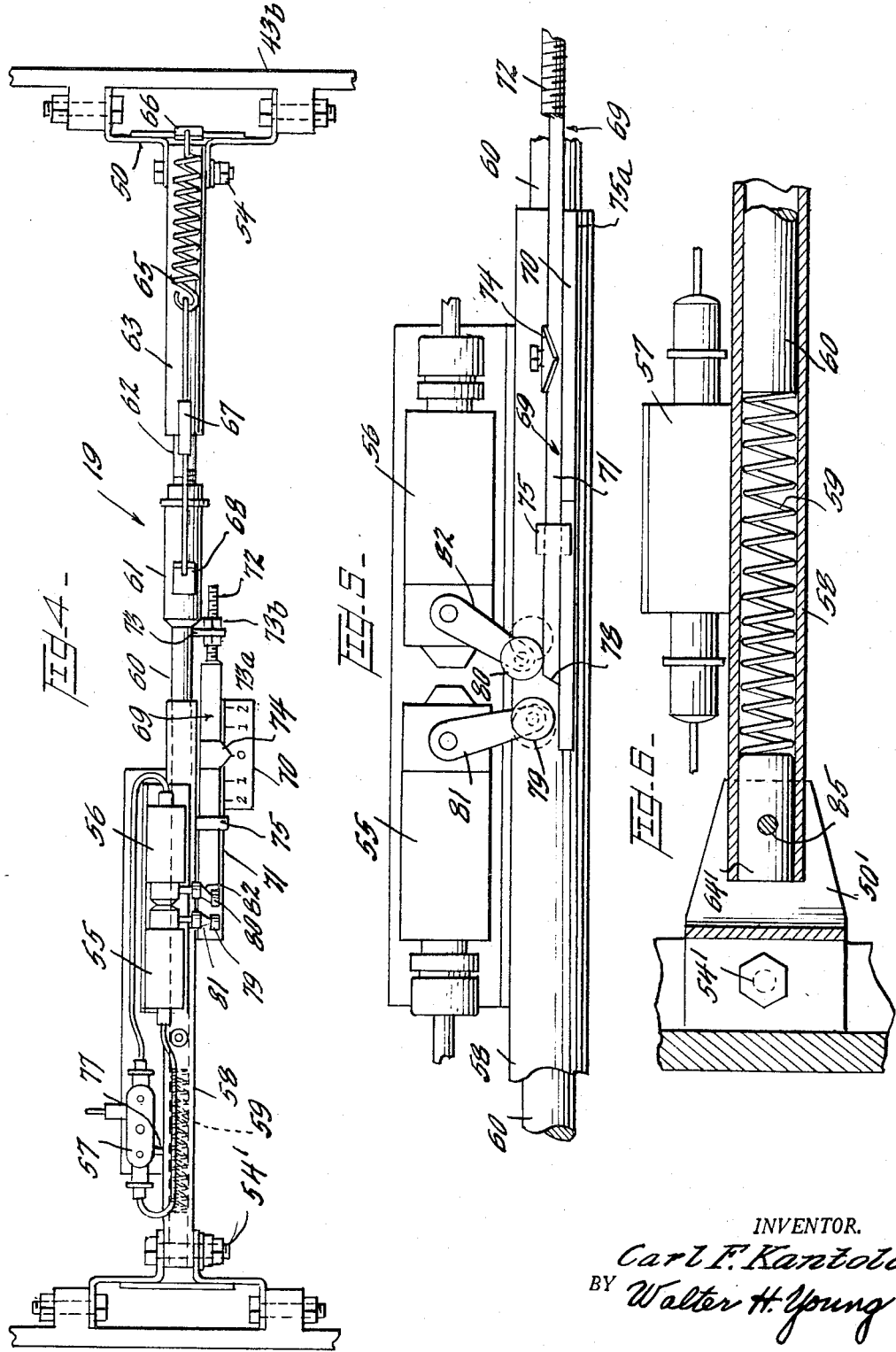

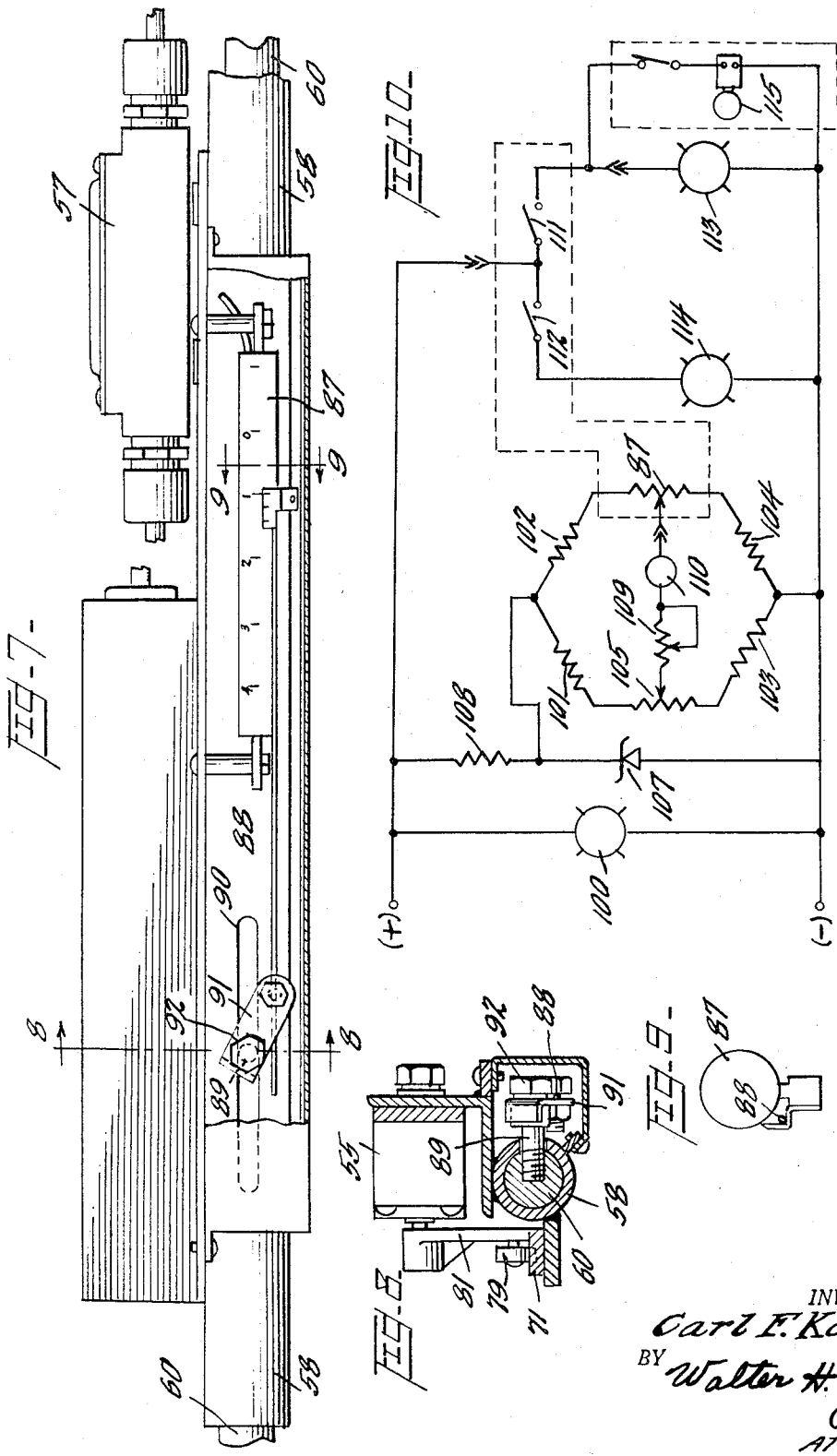

United States Patent Office 3,405,449
Patented Oct. 15, 1968

3,405,449
RAIL TRACK GAUGE
Carl F. Kantola, Dumont, N.J., assignor to The New York Central Railroad Company, a corporation of Delaware
Filed Jan. 17, 1967, Ser. No. 609,819
11 Claims. (Cl. 33—145)

ABSTRACT OF THE DISCLOSURE

The disclosure comprises a railway track gauge particularly adapted for use on the test carriage of a rail test car. A telescoping assembly has its respective inner and outer telescoping members operatively connected to the supports for the opposite gauge wheels to measure their spacing. A spring means which is independent of the telescoping assembly urges the wheels of the test carriage against the track rails. The apparatus is constructed to provide a maximum of clearance above the track rails. Narrow and wide gauge limit signals are provided and also a remote, continuous indication of rail spacing.

Background of the invention

Rail track gauges are adapted to move along the track rails and to give an indication of rail spacing, such as by providing a continuous signal representative of rail spacing or by providing a discrete signal whenever the track gauge varies from standard gauge by more than a predetermined amount. A track gauge of this type usually comprises two or more flanged wheels each intended to roll along one of the opposite track rails, a means for urging the opposite wheels at all times outwardly so that the flange of each bears against the respective rail, and gauging apparatus for sensing the separation of the gauge wheels.

Various types of rail track gauges are known in the prior art. Many of these comprise a pair of opposite wheels, together with a telescoping assembly, the opposite ends of which are operatively connected to a respective one of the wheels, and with a spring urging the telescoping members and thus the gauge wheels outwardly so that each wheel flange bears closely against the rail on which it rides. It is also known in the art to provide a visual indication of the amount of wheel separation by providing a scale and a cooperating pointer, with one of these members being connected to the outer telescopic member, and the other being connected to the inner such member, thereby providing a scale indication representative of the amount of extension of the telescopic members. It is further known to provide that such an assembly can be raised from the track rails when the device is to be operated through a switch frog or the like. It is further known to provide, by means of a potentiometer, an electrical signal which represents the amount of extension of the extensible member.

Summary of the invention

The rail track gauge of the present invention differs from those known in the prior art principally in that it is particularly adapted for use with a rail test car. Such a rail test car includes various types of apparatus for testing the trackway, including means for causing current to flow in the track rails and to measure the characteristics of such current and other electrical phenomena in order that the condition of the track rails can be determined as the test car moves along the track. The test car includes a test carriage which is mounted underneath the car and rides on the track rails when the rail is being tested, being at the same time adapted for movement of the entire test carriage away from the track rails when no testing is being undertaken. The test carriage comprises two or more flanged wheels which support the test carriage on the track rails, and a means is employed on the test car for urging the flanged wheels of the carriage at all times outwardly against the track rails. Another means is employed for urging the wheels of the test carriage downwardly against the track rails so that tight contact is maintained at all times with the track rails. The track gauge apparatus of this invention includes telescoping assembly having opposed free ends which are operatively connected to the test carriage at each side of the track rails. A further means is provided for measuring the amount of extension of this telescopic member to provide a measure of the track gauge.

When it is intended that the track gauge shall give a continuous, remote indication of track width, this is most readily accomplished by generating an electrical signal that represents continually the amount of extension of the telescoping assembly. Such a signal may conveniently be generated by affixing a potentiometer to one member of the telescoping assembly and operatively connecting the movable arm of the potentiometer to the other member of the assembly. However, when this is done, a problem arises because of the relatively limited amount of travel which can take place between the potentiometer body and its movable arm. This problem is particularly troublesome when the track gauge is intended for use on the test carriage of a rail test car, and presents little or no problem in the conventional rail gauges of the prior art. The latter employ a compression spring in the telescoping assembly for urging apart the telescoping members and thus also the gauge wheels, to ensure thereby that the wheel flanges are in close contact with the rails. To limit the extent of travel of the telescoping members when the gauge wheels are lifted from the track, it is only necessary to provide a properly positioned stop since such a stop is quite adequate to prevent undue separation of the telescoping members in response to the compression spring which need have only sufficient compressive force to urge outwardly against the track rails the relatively light mass of the gauge wheels and associated supports.

In a rail test car, on the other hand, a separate biasing means is used to urge the wheels of the test carriage outwardly against the track rails, and this biasing means must necessarily be of considerable force in order to work properly against the considerable mass of the component parts of the test carriage. Because of this, it is not practical to provide stops on the test gauge which will act as an effective restraint against the large force of the baising means as the test carriage is lifted from the track rails. In accordance with the teachings of this invention, a second telescoping assembly is provided with the respective parts thereof normally in a fully telescoped condition when the test carriage is on the track rails. However, this second telescoping assembly is capable of considerable extension when the test carriage is removed from the track rails so as to accommodate itself to the strong outward biasing tendencies of the spring biasing means ordinarily acting upon the test carriage. The two telescoping assemblies include at least one relatively small spring biasing means to ensure that the second telescoping assembly is normally fully telescoped in order that track gauge can be determined by measuring the amount of extension of the first telescoping assembly.

In a specific embodiment of the invention, the first telescoping assembly comprises a hollow pipe with a rod slidably fitting therein at one end and with the other end of the pipe being operatively connected to a support for one of the gauge wheels. The end of the rod which is outside the pipe is, in turn, connected to an element that slidably fits into one end of a second pipe whose other end is operatively connected to the support for the other of the gauge wheels. A means is provided ensuring that the slidably fitting element is normally fully telescoped within the second pipe and a further means is provided to measure the extent to which the first-mentioned rod is telescoped within the first pipe. When the gauge is lifted from the track rails, resulting in a considerable separation of the gauge wheels, both of the telescoping assemblies are free to extend their length; however, the first assembly is permitted to separate only a limited amount because of the limitations imposed by the associated potentiometer, whereas the second telescoping assembly is free to extend its length as much as required.

Another aspect of the invention is the provision of means for providing not only a continuous remote indication of track gauge but also discrete signals representing, respectively, an excessive variation to either side of the standard gauge.

*Brief description of the drawings*

In describing this invention, reference will be made to the accompanying drawings, in which like reference characters are used throughout the several views, and in which:

FIGURE 1 is a side view of the test carriage of the rail test car having thereon the track gauge of the present invention;

FIGURE 2 is a sectional plan view taken along the line 2—2 of FIGURE 1;

FIGURE 4 is a plan view of the track gauge of this invention;

FIGURE 5 is a view of the telescopic members of the track gauge and illustrates particularly the manner of actuation of the limit switches;

FIGURE 6 is a front view of the track gauge showing in detail and in cross section the telescopic members and their connection to the test carriage;

FIGURE 7 is a rear view of the test gauge illustrating the visual indicator gauge and the apparatus for actuating the potentiometer;

FIGURE 8 is a sectional view taken along the line 8—8 of FIGURE 7;

FIGURE 9 is a sectional view taken along the line 9—9 of FIGURE 7; and

FIGURE 10 is a circuit diagram illustrating the manner in which various output signals are obtained by the track gauge of this invention.

*Description of the preferred embodiment*

Figure 3:
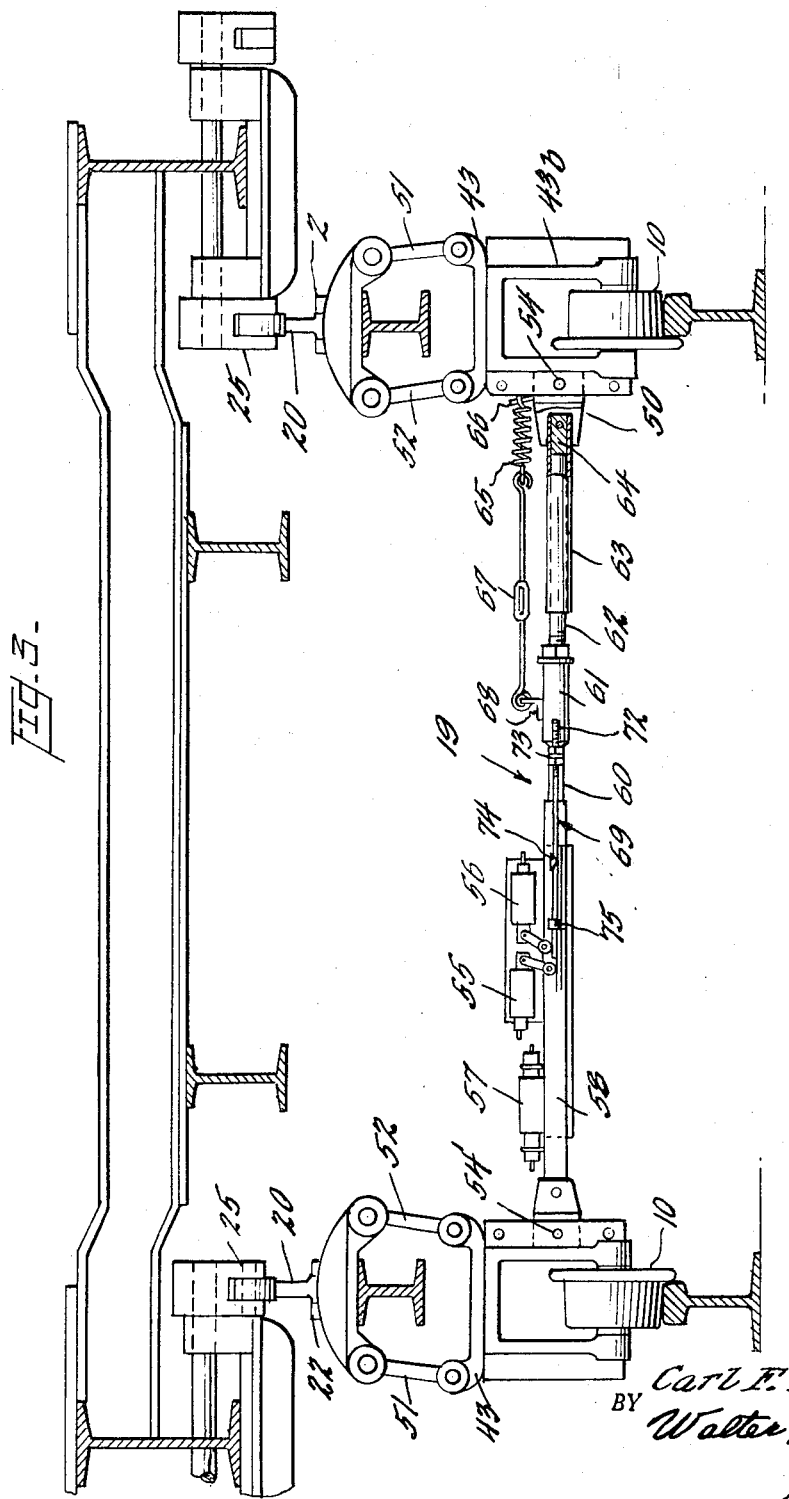
FIGURE 3 is a sectional front view of the track gauge of this invention.

Referring to FIGURE 1, there is shown the test carriage which is affixed to the underside of the rail test car and which supports the track gauge. The track gauge is supported upon four wheels, of which two, 10 and 11, are shown in FIGURE 1. It should be understood that these wheels are of significantly smaller diameter than the wheels which actually support the rail test car, and that the purpose of wheels 10 and 11 is merely to support the test carriage itself. In FIGURE 1, various channel members 12 run transversely of the test car, and support two channel members 13 which run along the length of the test car, one of these channel members being shown, although it will be appreciated that a similar channel member 13 is provided on the opposite side of the test car. The test carriage is connected to the frame of the test car by means of hold-down cylinders 14, the lower end of each of which is connected to the frame of the test carriage, while the upper end is pivotally connected to a supporting member 15 at the pivotal joint 16. Each cylinder 14 normally exerts a downward force upon piston 17, thereby maintaining a close contact of the wheels 10 and 11 with the track rail 18.

As shown in FIGURE 3, the test carriage comprises two substantially independent assemblies, one for each of the track rails, and between these is connected the rail test gauge 19. Referring again to FIGURE 1, there is illustrated the mechanism for selectively raising and lowering the test carriage. More specifically, a link 20 is shown as being pivoted at 21 to a member 22 which is rigidly secured to the test carriage at one side of the rail test car. Link 20 is provided with an elongated aperture 23 at its upper end through which passes a bolt 24 secured to one end of crank 25. The other end of crank 25 is pivotally secured at 26 to a piston member 27. A similar arrangement of parts is provided further to the right in FIGURE 1 and comprises a crank 28, an arm 29, and a support 30. In the position shown in FIGURE 1, piston 27 is in its right-most position so that each of the cranks 25 and 28 is in its most counterclockwise rotational position, thereby ensuring that no upward force is being exerted upon the supports 22 and 30 to lift the test carriage from the track rails. However, when the piston 27 is operated to the left from the position shown in FIGURE 1, both cranks 25 and 28 will rotate in the clockwise direction thereby raising the arms 20 and 29 and exerting an upward force on supports 22 and 30 so as to raise the test carriage from the track rails. The use of an elongate slot in the upper end of each of arms 20 and 29 makes it possible for the test carriage to move up and down as it operates over uneven track without exerting forces upon the linkage just described and thus to the piston 27.

The apparatus included in the rail test carriage which provides for each side thereof to be urged outwardly so that the wheel flanges press against the inside of each track rail is shown clearly in FIGURES 1 and 2. Thus, a cylinder 35 is shown in FIGURE 1 as having therein a coiled compression spring 36 whose right hand end bears against the interior end of the cylinder and whose left hand end bears against a shoulder on piston 37, thereby normally urging piston 37 to the left in FIGURE 1. Spring 36 is coiled about a rod-like end portion 37a of piston 37 which extends exteriorly of cylinder 35 and is clamped by means of a clamp 38 to rod 39 which is thus also normally urged to the left.

Rod 39 is pivoted at two different locations to a pair of coupled links as shown in FIGURE 2. Thus, at its left-hand end, rod 39 is pivotally coupled at the pivotal support 40 to a link 41 and also to another link 42. Link 42 is provided with a fixed pivotal support at its inner end, whereas the outer end of link 42 is pivotally coupled to a pin in the ears of a plate 43 which is secured to the main frame 43a of the test carriage. A similar link arrangement is provided at the right-hand end of shaft 39 in FIGURE 2 so that a similar frame support member 44 is also urged outwardly (in the downward direction in FIGURE 2), thereby ensuring that both the front and rear wheels of one side of the test carriage are urged outwardly with substantially equal force.

The spring-biasing means just described for urging the wheels of the test carriage on either side outwardly against the track rails will of course cause a substantial spread of the test carriage wheels in the event that the test carriage is raised from the track. When it is desired to replace the test carriage upon the track rails, it is obvious that the gauge between the opposite wheels of the test carriage must be substantially reduced to a value less than the actual track gauge before the track gauge can be again properly positioned upon the rails. This is accomplished by the admission of air under pressure to inlet pipe 45 of piston 35. The admission of air under pressure causes the piston 37 to move to the right, thereby compressing the spring 36 and thus moving both rod 37a and rod 39 to the right. When this happens, the links 41 and 42 of FIGURE 2 are brought closer together and the support 43 moves upwardly so that the gauge wheel attached thereto is moved laterally inward so as to reduce the gauge between the opposite wheels of the test carriage.

FIGURE 3 illustrates the pivotal supporting means for each side of the test carriage comprising cranks 25 and arm 20 which provides for the raising of the support 22 and thus also the gauge wheel support 43. It will be observed that there is coupled between the support 22 and the support 43 a parallelogram structure comprising the opposed arms 51 and 52 each of which is pivoted at its upper and lower end. Since the support 43 is rigidly secured to main frame 43a, it can be seen that lateral motion of the support 22 relative to the support 43 does not affect the angular position of support 43 which remains vertical so as to maintain the associated wheel 10 also in the vertical plane.

In FIGURE 3, the track gauge assembly 19 is shown as being pivotally connected to the wheel support 43b at 54, and the assembly 19 is shown as supporting narrow and wide gauge limit switches 55 and 56 respectively, and also condulet 57 which facilitates the making of various connections to the electrical circuit elements of the track gauge.

The plan view of FIGURE 4 shows in greater detail the track gauge assembly 19. Also, the pivotal support 54 for connection of the track gauge assembly 19 to the bracket 43 is shown.

The track gauge assembly comprises an outer hollow pipe 58 which supports in its left-hand interior portion a coiled compression spring 59, whose left-hand end abuts a plug 64 within pipe 58. Also within the outer pipe 58 is a slidable rod 60, one end of which bears against the spring 59 and the other end of which is welded into a coupling member 61. Threaded into the right end of this same coupling member 61 is another rod 62 which slidably fits into pipe 63, with pipe 63 being pivotally mounted at 54 to bracket 43b.

Only a limited range of motion of rod 60 relative to pipe 58 can be accommodated, for reasons already briefly mentioned and to be elaborated on below, and it is for this reason provided that the extensible assembly shall comprise a rod 62 fitting into a pipe 63. Normally, when the track gauge is resting upon the rails, and with the gauge wheels separated to the maximum extent possible by the mechanism already described, the right-hand end of rod 62 abuts against the plug member 64 in the right-hand end of pipe 63 both because of the effect of compression spring 59 and of tension spring 65. However, if the track gauge is lifted from the track rails, the amount of separation of the gauge wheels that then occurs substantially exceeds the permissible amount of travel of rod 60 relative to pipe 58 and it is thus provided that rod 62 can slide laterally to the left relative to pipe 63 to take up this extra motion. In this connection, as shown in FIGURE 3, a tension spring 65 is anchored at its right-hand end on the bracket 50 at 66 and is secured at its other end to a turnbuckle 67 whose left-hand end is connected to a support 68 which is welded to coupler 61. A function of spring 65 is to ensure that rod 62 normally has its right-hand end abutting plug 64 in pipe 63 so that track gauge can be determined solely by the position of rod 60 in pipe 58. Compression spring 59 in pipe 58 aids in this effort and also results in the taking up of any slack that may be present in the pivotal connection at 54'.

The means for providing a visual indication of track gauge is shown in FIGURES 4 and 5 as comprising a slidable bar 69 and integral pointer 74 which is adjustably secured to rod 60 and cooperates with a scale member 70 which is secured to pipe 58. Member 69 comprises a flat bar member 71 which is welded to a circular rod 72. Rod 72 is threaded into a bracket 73 that is welded to rod 60. Bar 71 supports the pointer 74 and slidably fits under a retaining member 75 which is integral with the scale indicator element 70. Elements 70 and 75 are directly secured, as by welding, to the exterior of pipe 58. Upon movement of rod 60 relative to pipe 58, bar 71 and pointer 74 move laterally relative to indicator 70 and thus provide an indication on the scale engraved in the indicator 70 of the variations of track gauge from the predetermined standard.

The condulet 57 is shown in FIGURE 4 as being secured to a bracket 77 which is, in turn, connected, as by welding, to the exterior of pipe 58.

FIGURE 5 shows that the bar 71 which is slidable upon the scale element 70 has a beveled end 78 which is adapted to engage the rollers 79 and 80 associated respectively with the narrow and wide gauge limit switches 55 and 56. Each of these rollers is mounted upon a respective arm 81 and 82, of one of these switches, and the arrangement is such that rotation of arm 81 in a clockwise direction from the position shown closes the normally open contact of the assocated limit switch. With respect to limit switch 55, its normally open contact is also open but closes when bar 71 moves to the right a sufficient amount to permit roller 79 to move to the dotted line position shown in FIGURE 5.

For example, in FIGURE 5, the position of bar 71 shown has resulted in actuation of arm 82 clockwise from the dotted-line position and the associated contact 111 (see FIGURE 10) is now open. If bar 71 were to move still further to the left in FIGURE 5, arm 81 would also be rotated clockwise as the associated roller 79 is contacted by the beveled end portion 78 of bar 71. This action of the bar 71 in moving to the left occurs whenever rod 60 is caused to move further into the surrounding pipe 58 (see FIGURE 4) and this occurs in response to narrow gauge of the track rails. In other words, if the track gauge becomes less than standard by a predetermined amount, bar 71 will move to the left and rotate arm 81 clockwise thereby closing the contact associated with the narrow gauge limit switch. Similarly, if the track gauge were to widen by an excessive amount such that it should be desired to given an indication of this fact, then the movement of bar 71 to the right from the position shown in FIGURE 5 will move the beveled end 78 of bar 71 to the right and thereby eventually permit arm 82 to rotate counterclockwise so that roller 80 is in the dotted line position shown, thereby closing the normally open contact associated with the wide gauge limit switch 56. The manner in which the limit switches 55 and 56 make possible the giving of distinctive warning signals will be explained below. Adjusting nuts 73a and 73b make possible the adjustment of the position of bar 71 relative to bracket 73 so that actuation of the limit switches 55 and 56 can be made to occur at predetermined relative positions of rod 60 and pipe 58.

FIGURE 6 shows in greater detail the manner in which the pipe 58 is secured to the left-hand bracket 50'. The connection is made by means of a bolt which passes through an aperture 85 in both the pipe 58 and the plug 64' which is inserted with a force fit into the end of the pipe 58. The use of the solid plug 64' ensures that there will be adequate bearing support at the pivot 54'. The spring 59 is also shown in FIGURE 6 and also a portion of the rod 60 which has a slidable fit within pipe 58 and with its left-hand end bearing against the right-hand end of spring 59.

In addition to providing for a scale indication of track gauge, provision is also made for generating an electrical signal dependent upon track gauge so that continuous, remote indication can be supplied. The apparatus for accomplishing this is shown in FIGURES 7, 8 and 9. FIGURE 7 is a rear elevational view of the apparatus which comprises a potentiometer 87 (see FIGURE 9), an actuating wire 88 for the potentiometer, and a projecting stud 89 (see FIGURE 8) which is threaded into rod 60 but protrudes through an elongated slot 90 in the outer pipe 58. As rod 60 slides into and out of the outer pipe 58 with variations in track gauge, the projecting stud 89 moves longitudinally in the elongated slot 90 (FIGURE 7) and thus moves the wire 88 along the length of the outer surface of the pipe 58 so as to control the amonut of resistance provided in the potentiometer 87. The length of slot 90 determines the maximum permissible amount of travel between rod 60 and pipe 58 and is selected to be no greater than the permissible amount of travel of the arm of potentiometer 87 relative to the body of the potentiometer. The cross-sectional view of FIGURE 8 illustrates the clamping means for the wire 88 which comprises an arm 91 secured at one end to the stud 89 between a pair of threaded nuts 92 and holding an end of wire 88 between a similar pair of threaded nuts at the other end of arm 91.

FIGURE 10 comprises a circuit diagram for the control of various indication devices. Energy is applied to the circuit from the terminals (+) and (−), and a pilot light 100 indicates that the energy is applied to the circuit. A Wheatstone resistance bridge is provided which includes fixed resistors 101 and 102 in the two upper arms of the bridge, and resistors 103 and 104 in the lower arms. A manually adjustable potentiometer 105 is provided for balancing the bridge, and potentiometer 87 is the potentiometer which is actuated by wire 88 as rod 60 moves into and out of the pipe 58. Control of the voltage applied to the bridge circuit is provided by a Zener diode 107 which is in series with a voltage dropping resistor 108.

In operation, the bridge is balanced for the setting of potentiometer 87 which occurs when the amount of extension of rod 60 relative to outer pipe 58 is that occurring when the gauge is on track having a standard separation. With the bridge thus balanced, no current flows through variable resistor 109 and through meter 110, the scale of which is calibrated to read in terms of inches of variation of the track gauge from standard gauge. As the movable arm of poentiometer 105 is varied in either direction from the balance position, the bridge circuit becomes unbalanced so that current flows through the central leg and energizes ammeter 110. The amount of current flowing is representative of the amount of unbalance of the bridge and thus is an indication of the variation of track gauge from standard, and the direction of current flow indicates whether the track gauge is greater or less than standard. A continuous indication is thus provided by meter 110 of the extent of variation of track gauge from the standard amount.

In addition, the circuit of FIGURE 10 includes two contacts 111 and 112. Contact 111 is the contact which is actuated by the wide gauge limit switch 56, and conact 112 is that which is associated with the narrow gauge limit switch 55. As previously mentioned, contact 111 is normally open assuming that track gauge is less than the amount for which a wide gauge indication should be given, whereas contact 112 is open unless the track gauge is reduced to a level below a predetermined minimum for which contact 112 becomes closed. Associated with each of the switch contacts in an indicator light 113 and 114, respectively, which provide a visual indication of excessively high or low track gauge. In the event of excessive track gauge, which represents a potentially dangerous condition, an audible signal is also given by the energization of an electric bell 115 which is energized whenever contact 111 is closed.

Having described a track gauge for railway track as one specific embodiment of my invention, I wish it to be understood that various modifications may be made to the form shown without departing from the scope of my invention.

What I claim is:

1. In a railway track gauge for use on a rail test car having a test carriage with flanged supporting wheels for the opposite track rails and means for urging said supporting wheels outwardly to maintain said wheel flanges in close contact with the respective track rails the improvement comprising, first and second elongate extensibly coupled members,
means operatively connecting one end of said first member to one of said supporting wheels,
a third elongate member having one end thereof operatively connected to the other of said supporting wheels,
means extensibly coupling said second member to the other end of said third member,
biasing means normally urging said second member toward said other supporting wheel,
and means responsive to the relative positions of said first and second members for providing a signal representative of track gauge.

2. In a railway track gauge for use on a rail test car having a test carriage with flanged supporting wheels for the opposite track rails and means for urging said supporting wheels outwardly to maintain said wheel flanges in close contact with the respective track rails the improvement comprising, first and second elongate extensibly coupled members,
means operatively connecting one end of said first member to one of said supporting wheels,
a third elongate member having one end thereof operatively connected to the other of said supporting wheels,
means extensibly coupling said second member to the other end of said third member, biasing means normally urging said second and third members toward each other in nonextended relationship,
means responsive to the relative positions of said first and second members over a limited range of relative motion for producing a signal representative of track gauge,
means preventing extension of said first and second members relative to each other beyond a predetermined amount,
said biasing means permitting extension of said second and third members relative to each other only when the separation of said supporting wheels is of an amount beyond that causing full extension of said first and second members to said predetermined amount.

3. The track gauge of claim 2 in which said responsive means comprises a potentiometer secured to one of said first and second members and a potentiometer actuating means coupled between the movable arm of said potentiometer and the other said first and second members.

4. The track gauge of claim 3 which further comprises a bridge circuit including said potentiometer, an ammeter responsive to an unbalanced condition of said bridge, and means for balancing said bridge circuit independently of said potentiometer, whereby the balancing of said bridge circuit at a time when the relative positions of said first and second members correspond to standard track gauge thereafter produces an indication on said ammeter of variations in track gauge from standard gauge.

5. The track gauge of claim 2 in which one of said first and second members telescopes into the other.

6. The track gauge of claim 5 in which said biasing means comprises a compression spring in the outer of said telescoping members bearing against the inner of said members.

7. The track gauge of claim 5 in which said second and third members also telescope one inside the other.

8. The track gauge of claim 2 in which said first and second members are each pivotaly coupled to supports for the respective supporting wheels.

9. The rack gauge of claim 2 in which said biasing means comprises a tension spring operatively connected at one end to the supporting wheel to which said third member is coupled and connected at the other end to said second member.

10. The track gauge of claim 2 in which said responsive means comprises at least one limit switch supported on one of said first and second members, actuating means for said limit switch connected to the other of said first and second members, and means controlled by said switch for providing a distinctive indication.

11. The track gauge of claim 2 in which said biasing means comprises a compression spring in said one tube and a tension spring operatively connected exteriorly between said member and said other tube.

References Cited

UNITED STATES PATENTS

| | | | |
|---|---|---|---|
| 747,872 | 12/1903 | Ellis et al. | 33—146 X |
| 1,084,760 | 1/1914 | Stavdal | 33—144 |
| 1,211,180 | 1/1917 | Krake | 33—146 |
| 1,607,882 | 11/1926 | Engelgau | 33—146 X |
| 1,633,535 | 6/1927 | Lusk | 33—145 |
| 2,824,376 | 2/1958 | Yarrow | 33—147 |

FOREIGN PATENTS 269,544  11/1929  Italy.

HARRY N. HAROIAN, *Primary Examiner.*